Dec. 25, 1951 P. J. NILSEN 2,580,188
DISPENSER FOR PRESSURIZED WHIPPED CREAM
Filed Jan. 13, 1948
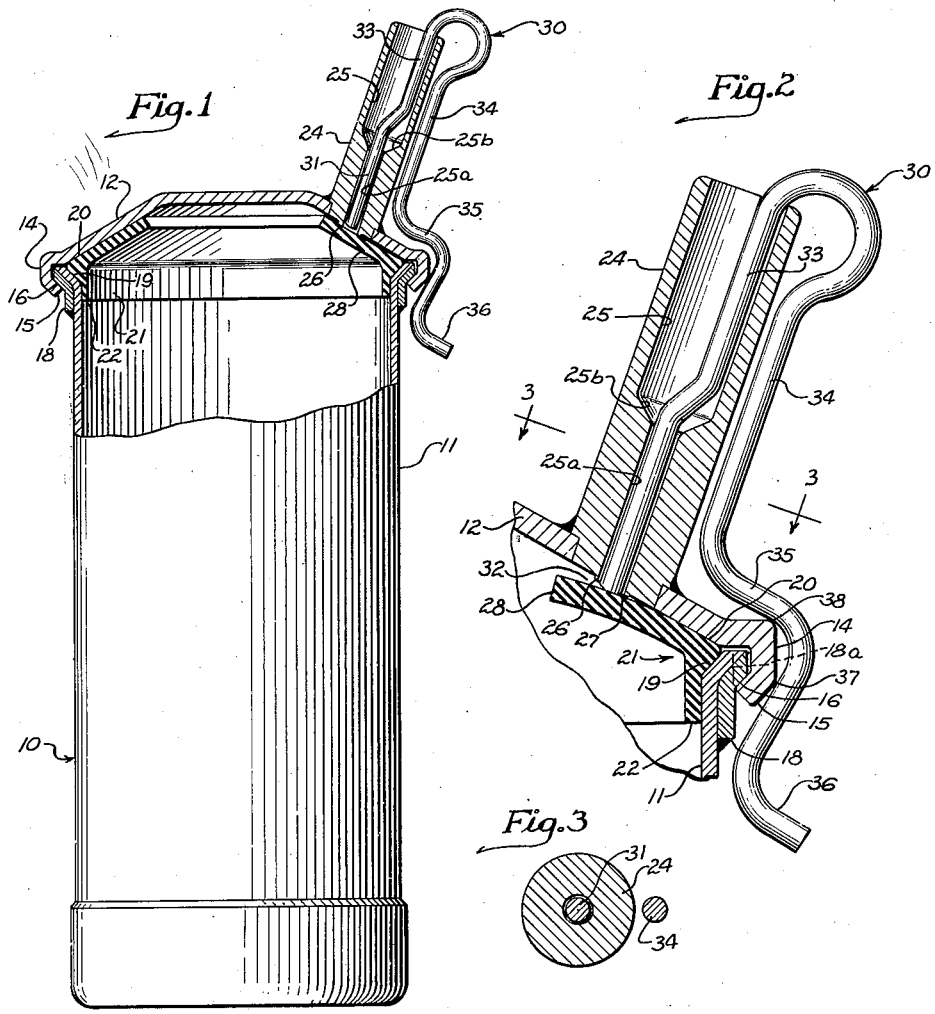
Inventor
Peter J. Nilsen
Carlson, Pitzner, Hubbard & Wolfe
Attys.

Patented Dec. 25, 1951

2,580,188

UNITED STATES PATENT OFFICE 2,580,188

DISPENSER FOR PRESSURIZED WHIPPED CREAM

Peter J. Nilsen, Oak Park, Ill.

Application January 13, 1948, Serial No. 2,005

6 Claims. (Cl. 222—394)

The present invention relates to dispensers for aerated expanded food products and in particular to devices for converting pressurized liquid cream into a smooth whipped consistency.

The conversion of cream into the whipped form by subjecting it to an inert gas under pressure and then discharging it to atmospheric pressure as required has greatly cheapened and simplified the use of whipped cream in soda fountains and the like. Such dispensers, however, have been subject to a number of drawbacks preventing more widespread use. For example, they have been difficult and expensive to clean and in a number of states available types have been barred by the health authorities due to the danger of contamination. Even in states where conventional types of dispensers are allowed, hand cleaning is a difficult and disagreeable task and consequently one which is frequently neglected. Conventional designs are likewise very poorly adapted for cleaning by machine in the distributor's plant. As a result it has been possible for the cream to taste soured or tainted with consequent loss of customer good will. Then too, many conventional types of dispensers produce a product which is considerably different from that produced by mechanical agitation. The cream is merely fluffed with gas bubbles which are large and non-uniform in size. As a result the cream has an "artificial" appearance resembling whipped gelatin more than the smooth product preferred by the customer.

A still further drawback of conventional dispensers is the high first cost due to the large number of component parts which makes economical home distribution impracticable. To safeguard the distributor, a "deposit" may be required from the customer which is more than the average customer is willing to pay, and danger of theft when the dispenser is put out with the bottles for pickup is appreciable.

Accordingly, it is an object of the present invention to provide a dispenser which not only meets the most exacting health department requirements but in which all surfaces to be cleaned may be readily exposed for flushing or scrubbing by hand or cleaning in a simple washing machine. It is an allied object to provide a whipped cream dispenser which is inexpensively constructed using a minimum number of parts and without the necessity for working to close dimensional tolerances.

It is another object to provide a dispenser which produces cream of uniform whipped consistency which is neither too fluffy nor too liquid and which closely resembles the rich appearing product produced by hand whippers.

It is a further object to provide a whipped cream dispenser which may be rapidly filled under high pressure and which is substantially leakproof both during storage and in the course of repeated use. It is a more detailed object to provide a dispenser in which the sealing surface is automatically renewed as an incident to cleaning and reassembly.

Other objects and advantages of the invention will be apparent from the following detailed description taken in connection with the accompanying drawings, in which:

Figure 1 is an elevational view in partial section showing a preferred form of a whipped cream dispenser embodying my invention.

Fig. 2 is a fragmentary enlarged view showing the operation of the stopper flap upon depression of the trigger pin.

Fig. 3 is a sectional view taken along line 3—3 in Fig. 2.

While the invention is susceptible of various modifications and alternative constructions and uses, I have shown in the drawing and will herein describe in detail only the preferred embodiment of the invention. It is to be understood, however, that I do not intend to limit the invention by such disclosure, but aim to cover all modifications and alternative constructions and uses falling within the spirit and scope of the invention as expressed in the appended claims.

Referring now to Figure 1 it will be seen that the dispenser includes a pressure vessel indicated generally at 10 formed of a cup 11 and a cover 12 which is preferably dome shaped. In order that the vessel might withstand pressure on the order of 200 pounds per square inch or more, the cover is provided with a skirt or flange 14 having inwardly bent tabs 15. The latter are in locking engagement with the upper edge 16 of the cup 11 which may, if desired, have a reinforcing ring 18 welded or otherwise fastened thereto. As is conventional, the ring 18 may be slotted at intervals as at 18a (Fig. 2) in order to register with the spaces between the tabs and thereby produce a bayonet-type locking action.

In accordance with one of the aspects of the invention the cup and cover include opposed conical surfaces 19, 20 respectively, which, taken together, define a V-shaped annular groove. Within this groove is fitted a registering gasket of wedge-shaped cross section indicated generally at 21. If desired, such gasket may be provided with a skirt as shown at 22. Using such construction it is observed that gas pressure within the vessel 10 serves to press outwardly on the gasket 21, wedging the gasket firmly into engagement with the opposed surfaces 19, 20 on the cup and cover respectively. The greater the pressure the greater is the sealing effect, and it has been found that cream may be stored under pressure for long periods without the slightest danger of leakage. It will be apparent to one skilled in the art that the gasket and locking arrangement is released under zero pressure conditions, for example, after the cream is exhausted, thus enabling unlocking by hand without recourse to wrenches or the like.

In order to discharge cream from the container a nozzle 24 is provided which is preferably welded or otherwise fastened to the cap 12. This nozzle has a passage 25 which is centrally bored therein and which leads to the interior of the vessel. The passage 25 has a reduced inner portion 25a and an enlarged outer portion 25b. Surrounding the inner mouth of the passage is an annular portion of the vessel wall which may be referred to as a land 26.

In accordance with one of the aspects of the invention, sealing of the vessel at the land surrounding the discharge aperture is accomplished by a stopper flap of resilient rubber-like material which is urged into sealing engagement with the land by reason of its own inherent resiliency. In the embodiment disclosed in Fig. 1 the stopper flap indicated at 28 is formed integrally with the gasket 21 and comprises an upward extension thereof. Thus, with the gasket in the seated position shown, the resiliency of the gasket material is sufficient to bring the stopper flap 28 intimately into engagement with the land 26, even when the pressure inside of the vessel is atmospheric. Upon subjecting the interior of the vessel to additional gas pressure it will be apparent to one skilled in the art that such pressure serves to press the stopper flap even more intimately into engagement with the sealing surface 26 surrounding the passage 25. Additional sealing effect may, if desired, be obtained by providing a raised lip or ridge at the inner end of the discharge passage. Such lip, indicated at 27 produces a ring of localized sealing pressure and has been found particularly helpful with certain kinds of rubber-like materials.

In order to dispense the pressurized cream I provide a plunger or trigger pin 30 of novel construction, one end of which extends downwardly into the nozzle 24 in telescoped relation engaging the stopper flap 28. As brought out more clearly in Fig. 2, depression of the trigger pin 30 causes the underlying portion of the stopper flap 28 to be forced downwardly away from the sealing surface or land 26. With the vessel inverted liquid cream will be forced out under pressure through a narrow crack 32 and past the sealing surfaces 26 into the discharge nozzle 24.

I have observed that the cream thus escaping has a more desirable consistency if the inner portion 25a of the passage 25 is dimensioned only slightly oversize with respect to the cooperating portion 31 of the trigger pin, with the passage 25 flaring outwardly as at 25b at approximately the central portion of the nozzle 24. The flared enlargement of the passage serves as an expansion chamber and should be constructed in about the proportions shown. As to the pin, optimum results have been obtained employing a diameter in approximately the range of .140 to .150 inch in a passage 25a having a diameter of approximately .156 inch. The latter forms an annular escape passage for the cream, which is quite narrow, being more or less a continuation of the narrow crack 32 produced by the displacement of the trigger pin. Under such conditions it has been found that an "overrun" or volumetric expansion of the cream by approximately four is produced. The charging pressure employed during the testing of the device varied between approximately 80 pounds and 250 pounds per square inch and satisfactory operation was had throughout such range.

In practicing the invention the stopper flap is preferably constructed to present a slightly different sealing surface each time the device is reassembled, minimizing wear and preventing the rubber-like material from acquiring a permanent set through long and repeated use. To this end the flap 28 in the preferred embodiment is made annular or conical in shape. As a result of the symmetrical nature of the gasket, the small portion thereof which is used for sealing is perfectly random, being renewed each time the dispenser is charged with cream, and proper sealing is thereby assured. This is to be contrasted with conventional devices in which the same sealing surfaces are used during the life of the device without automatic renewal, thereby running the danger of leakage of the pressurized cream.

Turning more detailed attention to the trigger pin 30 it will be seen that it is of U shape, including an offset portion 33 which is arranged adjacent the inner surface of the nozzle 24 and a return portion 34 which is adapted to extend closely along the outer surface of the nozzle. At the foot of the portion 34 is an offset portion 35 which is hooked over the edge of the cover flange 14 terminating in a trigger 36. The latter is positioned to be readily engaged by the index finger of the user upon inverting the dispenser. Inadvertent loss of the trigger pin is prevented by friction in the region 37. By properly proportioning the length of the valve operating portion 31 of the trigger pin with respect to the offset portion 35, inward movement of the trigger pin, and consequently the rate of discharge of the dispenser, is definitely limited. Upon full depression of the pin it will be seen in Fig. 2 that interference takes place at the region 38 on the cover of the dispenser when the flap is just slightly ajar. This makes it substantially impossible for any large amount of cream to be accidentally discharged.

Assuming that cream has been put in the cup and in the absence of the pin 30, it will be apparent that the present construction enables the dispenser to be charged with gas through the same nozzle 24 which is used for dispensing purposes. To do this it is merely necessary to apply a source of nitrous oxide or similar gas under high pressure through the mouth of the nozzle. The rate at which the gas is added to the cream is not limited since the stopper flap 28 may be deflected by the pressure of the incoming gas to any required extent. Due to the fact that no portion of the nozzle construction need be removed during the charging process, it will be apparent that the present construction is admirably adapted to the filling of the dispensers automatically as a machine operation.

If desired, the dispenser may be mechanically agitated as the gas is applied in order to more completely dissolve the gas in the cream.

The trigger pin 30 is also preferably absent during the transportation of the dispenser. This is analogous to removing a key and insures that the cream is not removed before the dispenser is delivered. In addition, removal of the pin prevents accidental loss of the cream or relief of internal gas pressure which would take place if the trigger pin 30 were depressed in transit, for example, due to the stacking of a number of dispensers upon one another. For further protection a sanitary sealing cap may be slipped over the nozzle immediately after charging.

As a result of the foregoing, the trigger pin may be conveniently left at the fountain. It is to be especially noted that the retention of a portion of the dispensing apparatus at the fountain has, in the past, been prohibited by health authorities because of the crevices, threads and the like, which could not be adequately cleaned by fountain employees. The arresting simplicity of the present trigger pin and its ease of cleaning has, however, completely removed the normal objection. On the contrary, wholehearted endorsement of both the construction and mode of distribution has been obtained in a number of the most strict states and municipalities. Further, the use of a limited number of pins at a fountain serves as a clear indication as to which dispensers are in active use, preventing confusion and insuring that the cream is consumed in the order in which it is received.

After the cream has been exhausted and the container is returned to the supplier, the cleaning prior to recharging is an extremely simple process. It is merely necessary for the cover 12 and gasket 21 to be removed from the cup 11. The gaskets from many such containers may be washed in quantity by a tumbling or scrubbing operation, while the cup 11 and the cover 12 are automatically washed by a suitable automatic washer, generally of the bottle washing type. Since there are no crevices, threads, or the like in the interior of the container, such washer may be extremely simple and inexpensive to construct and operate. To clean the interior of the passage 25 it is sufficient to pass a bottle cleaning brush downwardly therein, an operation which is readily performed as the covers enter or emerge from the machine. Regardless of whether the washing is automatic or manual it is to be noted that the parts to be washed at the dairy are only three in number and are sufficiently large and simple that there is no danger of deformation during cleaning or loss down the drain. No skill is required and inexpensive labor may be utilized. Later assembly of the container prior to charging is likewise a simple matter, requiring merely that the gasket 21 be inserted and the cover engaged with an easy twist.

Experience has shown that the dispenser is inherently inexpensive to construct and thus readily adapted for home use as well as use in commercial establishments. Since it is of durable construction, a large number of "trips" may be made from the dairy with little danger of damage from careless handling or misuse. The whipped cream produced by the improved dispenser, having an "overrun" of approximately four, is exceptionally uniform in texture.

I claim as my invention:

1. A whipped cream dispenser comprising, in combination, a cup, a cover therefor, an aperture formed in said cover and defining an internal land, an annular sealing flap extending symmetrically around the wall of said dispenser and anchored between said cup and said cover to sealingly engage said land, a manually operated trigger pin extending through the aperture for unseating said flap from said land, said aperture being located along the edge of said cover and said annular flap being rotatable with respect to said cover to present a random portion thereof to said land upon reassembling the dispenser after cleaning and thereby effecting constant renewal of the sealing surfaces throughout the life of the dispenser.

2. In a whipped cream dispenser for use with a discharge pin, the combination comprising a cup and a cover, locking means for holding said cup and said cover in engagement, said cup and said cover having annular surfaces at the region of juncture which are opposed to one another and which together form a generally V-shaped groove, an annular gasket of generally wedge-shaped cross section nestingly received in said V-shaped groove, a first flange extension on said gasket extending inwardly therefrom and in flat contact with the inner surface of said cover, a second flange extension on said gasket extending downwardly along the inner wall of said cup, said cover providing a discharge passage for the telescoping reception of said pin and having an aperture located adjacent the edge of said cover and in position to be overlappingly covered by said first flange extension, said gasket being constructed of resilient rubber-like material so that upon application of internal pressure said gasket, by reason of such pressure, is pressed into intimate sealing engagement with the surfaces of said V-shaped groove while the flanges thereon are pressed into sealing engagement with the walls of said cover and cup respectively, said first flange extending continuously along the periphery of said gasket so that a random portion thereof is presented for sealing engagement with said aperture upon cleaning and reassembly of the dispenser.

3. In a whipped cream dispenser the combination comprising a pressure vessel having a cup and a cover, a nozzle mounted in the cover of said vessel and providing access to the interior thereof, said nozzle having a passage of relatively small bore which terminates at its inner end substantially flush with the inner surface of the cover along the edge thereof, a sealing member comprising a resilient body of rubber-like material having an extensive surface positioned to flatly engage the inner wall of said vessel and overlap said passage for normally sealing off the same, and a separable valve plunger received in said bore, said valve plunger having means at its outer end for application of manual squeezing pressure thereon and terminating in a straight portion at its inner end for pressing against said resilient sealing member, said valve plunger occupying a major portion of the diameter of said bore to provide an annular discharge passage and freely slidable therein so as to permit resealing upon release of manual squeezing pressure, and means for positively limiting the inward movement thereof to limit the maximum rate of cream discharged to a usable value.

4. A whipped cream dispenser comprising, in combination, a pressure vessel having a cup and a cover, means for keeping said cup and said cover in engagement, said cup and said cover providing surfaces at the region of juncture which are opposed to one another and which together form an internal groove, a gasket of generally registering cross section adapted to be received in said groove, said vessel having a nozzle with a discharge passage formed therein terminating at its inner end in an aperture surrounded by a land adjacent said groove, said land being slightly raised relative to the inner wall of the vessel, an extension flange on said gasket extending along the periphery of said gasket and having a random portion thereof overlapping said land, said gasket being constructed of resilient rubber-like material so that upon charging of the vessel with pressurized cream said gasket is pressed into intimate sealing engagement not only with the surfaces defining said groove but also with said land, and means including a plunger having a straight end portion slidable in said passage and occupying the major portion of the diameter thereof to form a restricted annular cream passage, said plunger having its lower end in contact with said flange, and said plunger having means at its upper end for restricting inward movement thereof under manual pressure to an amount just sufficient to break the seal for enabling controlled discharge of cream from the vessel.

5. In a whipped cream dispenser the combination comprising a pressure vessel, a nozzle mounted in the wall of said vessel and providing access to the interior thereof, said nozzle having a passage of relatively small bore which extends smoothly to the interior of said vessel and which is surrounded at its inner end by an annular land, an annular sealing member comprising a resilient body of rubber-like material lying flatly adjacent the inside surface of said vessel and with a peripheral portion thereof engaging said land and sealing off said passage, and mounting means in said vessel for engaging the outer edge of said annular sealing member for not only holding said sealing member against said land but also enabling the member to be rotated within the vessel so that the portion of the surface thereof presented to said land upon reassembling the dispenser after cleaning is random and thereby effecting constant renewal of the seal, and a valve plunger received in said passage and pressing against said resilient sealing member, said valve plunger having a straight inner end portion mating with said passage and freely slidable therein to form a restricted annular escape orifice, said valve plunger having means at its outer end for application of manual squeezing pressure thereon and for enabling inward movement of the plunger to a degree just sufficient to move said sealing member ajar to enable controlled discharge of the cream.

6. A whipped cream dispenser for use with a discharge pin having a straight inner end portion, the combination comprising a cylindrical pressure vessel, a removable cover for one end of the vessel and having means for maintaining the same in seated position, a discharge nozzle integral with said cover and having a pin-receiving passage which terminates at its inner end in an aperture which is substantially flush with the inner surface of said cover, an annular gasket between said vessel and said cover for effecting a pressure seal therebetween, said gasket having an annular flange portion which extends inwardly along the inner surface of the cover and also upwardly so that a limited peripheral portion thereof lies in flat sealing engagement with said aperture when the gasket is seated, said annular flange portion being substantially continuous and symmetrical so that the limited portion of the flange which seals said aperture is, upon reassembly of the dispenser after cleaning, entirely at random with the result that the sealing surfaces thereon are constantly renewed.

PETER J. NILSEN.

REFERENCES CITED

The following references are of record in the file of this patent:

UNITED STATES PATENTS

| Number | Name | Date |
|---|---|---|
| 228,132 | Smith et al. | May 25, 1880 |
| 676,009 | Ripper | June 11, 1901 |
| 1,060,464 | Langlois | Apr. 29, 1913 |
| 2,075,249 | Wilson | Mar. 30, 1937 |
| 2,305,286 | Ward | Dec. 15, 1942 |
| 2,351,751 | Fruin | June 20, 1944 |
| 2,376,052 | Hacmac | May 15, 1945 |
| 2,487,434 | Geiss et al. | Nov. 8, 1949 |